United States Patent
Peterson et al.

(10) Patent No.: US 8,173,561 B2
(45) Date of Patent: May 8, 2012

(54) INERT HIGH HARDNESS MATERIAL FOR TOOL LENS PRODUCTION IN IMAGING APPLICATIONS

(75) Inventors: Elizabeth Ann Binky Peterson, Latrobe, PA (US); William Roy Huston, Traverse City, MI (US); Irene Spitsberg, Export, PA (US); Michael James Verti, Murrysville, PA (US); Sudhir Brahmandam, Irwin, PA (US)

(73) Assignee: Kennametal Inc., Latrobe, PA (US)

( * ) Notice: Subject to any disclaimer, the term of this patent is extended or adjusted under 35 U.S.C. 154(b) by 240 days.

(21) Appl. No.: 12/615,885

(22) Filed: Nov. 10, 2009

(65) Prior Publication Data

US 2011/0111945 A1    May 12, 2011

(51) Int. Cl.
    *C04B 35/52*    (2006.01)
    *C04B 35/56*    (2006.01)
    *C22C 29/08*    (2006.01)

(52) U.S. Cl. .............. 501/93; 501/87; 75/240

(58) Field of Classification Search .......... 501/87, 501/93; 75/240
    See application file for complete search history.

(56) References Cited

U.S. PATENT DOCUMENTS

| | | | |
|---|---|---|---|
| 4,923,512 A | 5/1990 | Timm et al. | |
| 4,945,073 A | 7/1990 | Dubensky et al. | |
| 5,256,608 A | 10/1993 | Dubensky et al. | |
| 5,334,561 A | 8/1994 | Matsui et al. | |
| 5,563,107 A * | 10/1996 | Dubensky et al. | 501/87 |
| 5,612,264 A | 3/1997 | Nilsson et al. | |
| 5,681,783 A | 10/1997 | Nilsson et al. | |
| 6,030,912 A * | 2/2000 | Yamamoto et al. | 501/87 |
| 6,240,235 B1 * | 5/2001 | Uno et al. | 385/137 |
| 6,843,824 B2 * | 1/2005 | Anderson | 75/240 |

FOREIGN PATENT DOCUMENTS

| | | |
|---|---|---|
| JP | 2003-048004 A | 2/2003 |
| JP | 2008-094670 A | 4/2008 |

OTHER PUBLICATIONS

Lee, G.H., Kang, S., "Sintering of nano-sized WC-Co powders produced by a gas reduction-carburization process", Journal of Alloys and Compounds, Dec. 5, 2005, pp. 281-289, vol. 419 issues 1-2, Elsevier B.V. (online), Amsterdam.

* cited by examiner

*Primary Examiner* — Jerry Lorengo
*Assistant Examiner* — Noah Wiese
(74) *Attorney, Agent, or Firm* — Matthew W. Gordon

(57) ABSTRACT

A tungsten carbide material for use in precision glass molding applications having 6.06-6.13 wt. % carbon, 0.20-0.55 wt. % grain growth inhibitor, less than 0.25 wt. % binder, less than 0.6% wt. % impurities, and balance being tungsten. The tungsten carbide material has a nominal grain size of less than 0.5 microns.

20 Claims, 4 Drawing Sheets

INVENTIVE SAMPLE

COMPARATIVE SAMPLE

INERT HIGH HARDNESS MATERIAL FOR TOOL LENS PRODUCTION IN IMAGING APPLICATIONS

FIELD OF THE INVENTION

The invention is directed to a densified inert material for use in glass molding processes, and more particularly, is a tungsten carbide material and a method of manufacturing thereof.

BACKGROUND INFORMATION

Modern glass-making process requirements have placed a greater demand on the performance of materials used for glass-making molds. For instance, glass quality requirements are greater, process temperatures are higher, closer control of dimensional tolerances is desired, longer service life is expected, and high productivity has become an economic necessity. All of these requirements have pushed the demands on the properties and performance of mold materials to higher and higher levels. This is more so prevalent in the precision glass making industry as the growth of the lens market in consumer electronics, for example camera phones and digital cameras, and industrial optics has shifted lens production from traditional diamond turning operations to high volume, low cost molding operations.

In addition to improving the quality of the mold material which in turn improves the quality of the molded glass, increasing mold life is also desired. Examples of factors that affect both quality and mold life is the chemical inertness as well as the machinability of the mold material. In particular, precision glass lens producers report chemical interaction of the hot mold material with the molten glass during molding operations as being one of the primary causes of mold failure. This problem of a contaminant in the mold not only decreases mold life but also diminishes the optical purity of the glass or lens being produced. An example of such a contaminant is nickel which can diffuse into the glass/lens during production. One solution that has been utilized to prevent such diffusion is the use of a coating layer on the mold to minimize the interaction between the mold and glass. However, even with the presence of a coating, typically less than 0.5 microns in thickness, it is still possible for a contaminant (iron/nickel) to diffuse through and react with the glass. Thus, while helping to delay the mold-to-glass interaction, the presence of a coating has not, to date, been successful in preventing the diffusion of contaminants.

In addition to the problem of contaminants diffusing through to the lens or to the mold during the molding operation, dimensional accuracy and surface finish of the mold material can also have an effect on mold life. Material imperfections which are revealed during final polishing add additional costs to the manufacturing process in the form of reduced tooling yield and expenses related to rework. The machining of aspheric shapes in molds renders the molds relatively expensive, particularly since very hard and durable mold materials are generally required.

An array of solutions has already been considered in the industry for addressing the problems of mold life, fabrication costs as well as quality of the molded glass. One solution includes the use of a high chemical purity silicon carbide material. While the chemical inertness and high hardness of silicon carbide make it a material of interest for precision glass molds, the brittle nature of silicon carbide can present handling and finishing concerns. Furthermore, silicon carbide is often an expensive material solution and therefore is not practical.

Another alternative may be the use of ceramics. The relative inertness and high hardness of ceramic materials, such as silicon nitrides, are beneficial for applications such as glass molding. However, final grinding and polishing can be time consuming and expensive due to the parameters required to obtain the required surface finish without chipping and/or breaking. More importantly, the co-efficient of thermal expansion in ceramic materials is significantly lower than that of the glass being molded and introduces mold design challenges.

As mentioned above, coatings may be another alternative. The application of coatings which are resistant to oxidation and wear have been proposed for glass molding dies. Coating adhesion is a consideration in all coated tooling applications. In applications in which tooling can be refinished, or dressed, the thickness of the coating must also be considered.

Another option is a binderless carbide. This solution has been discussed in the industry as a good fit for precision glass molding applications due to the high hardness and matching coefficient of thermal expansion of tungsten carbide. It is understood, however, that achieving full densification in the absence of a binder material presents a significant manufacturing challenge, leading this type of material to have microstructural defects which in turn renders it unsuitable for finishing as well as subsequent usage for mold tooling.

It also must be understood that diffusion of the metallic binder which, in theory can be eliminated by making the material "binderless", is only one proposed reason for degradation of the glass during the molding process. The inertness of the mold material to the glass can also be dependent on other factors such as overall chemical composition, impurity level, and chemistry and microstructure of secondary phases that may be present in the material as a result of either the material design or processing.

It has also been reported that anomalous phases containing metallic and carbide constituents (known as inclusions and anomalous phases) are sometimes present in the material. These phases are often associated with clusters of porosity, and their presence impairs grindability and performance of the material. Origin of these constituents is generally hard to trace, and improvements in the material design would be needed to eliminate these unwanted phases.

To successfully address the functional requirements of precision glass molds, technical solutions need to consider both the advantages and challenges of specific design concepts which balance inertness with machinability. Accordingly, there is a need for a cost effective material system for precision glass molding operations that is chemically inert and can be finished to a nanometer surface finish.

SUMMARY OF THE INVENTION

An embodiment is a tungsten carbide material having 6.06-6.13 wt. % carbon, 0.20-0.55 wt. % grain growth inhibitor, less than 0.25 wt. % binder, less than 0.6% wt. % impurities, and balance being tungsten. The tungsten carbide material may have a nominal grain size of less than 0.5 microns, such as 0.25 to 0.4 microns. The binder may be from 0.1 to 0.15 wt. % cobalt. The carbon content may be from 6.09 to 6.10 wt. %. The tungsten carbide material may consist essentially of monotungsten carbide. The grain growth inhibitor may be vanadium carbide, chromium carbide, niobium carbide, or a combination thereof. The tungsten carbide material may be a mold used in precision glass molding. The tungsten carbide material may have a density of at least 98% of theoretical density and a void volume of less than 2%.

Yet another embodiment includes a mold made for precision glass molding. The mold may include 6.06-6.13 wt. % carbon, 0.20-0.55 wt. % grain growth inhibitor, less than 0.25 wt. % total binder, less than 0.6 wt. % impurities, and a balance being tungsten. The mold may have a nominal grain size of less than 0.5 microns, such as 0.25 to 0.4 microns. The grain growth inhibitor may be vanadium carbide, chromium carbide, niobium carbide, or a combination thereof. The binder may be from 0.1 to 0.15 wt. % cobalt. The mold may include from 6.09 to 6.10 wt. % carbon. The mold may be essentially monotungsten carbide and may have a density of at least 98% of theoretical density and a void volume of less than 2%.

Another embodiment is directed to a method of manufacturing an article for molding glass. The method includes compacting a material, debindering the material, and thermally densifying the material. The material includes 0.20-0.55 wt. % grain growth inhibitor, 6.06-6.13 wt. % carbon, less than 0.25 wt. % binder, less than 0.6 wt. % impurities and balance being tungsten. The material may include from 6.09 to 6.10 wt. % carbon. The material may include a binder of from 0.1 to 0.15 wt. % cobalt. The method may further include a step of machining the material after thermally densifying the material. The step of thermally densifying may include thermal sintering, pressure assisted sinter (HIP), rapid omnidirectional compaction, microwave sintering and spark plasma sintering. The article may be a mold, blank, semi-finished component or the like. The article may have a density of at least 98% of theoretical density and a void volume of less than 2%.

These and other aspects of the present invention will be more apparent from the following description.

DETAILED DESCRIPTION

Figure 1:
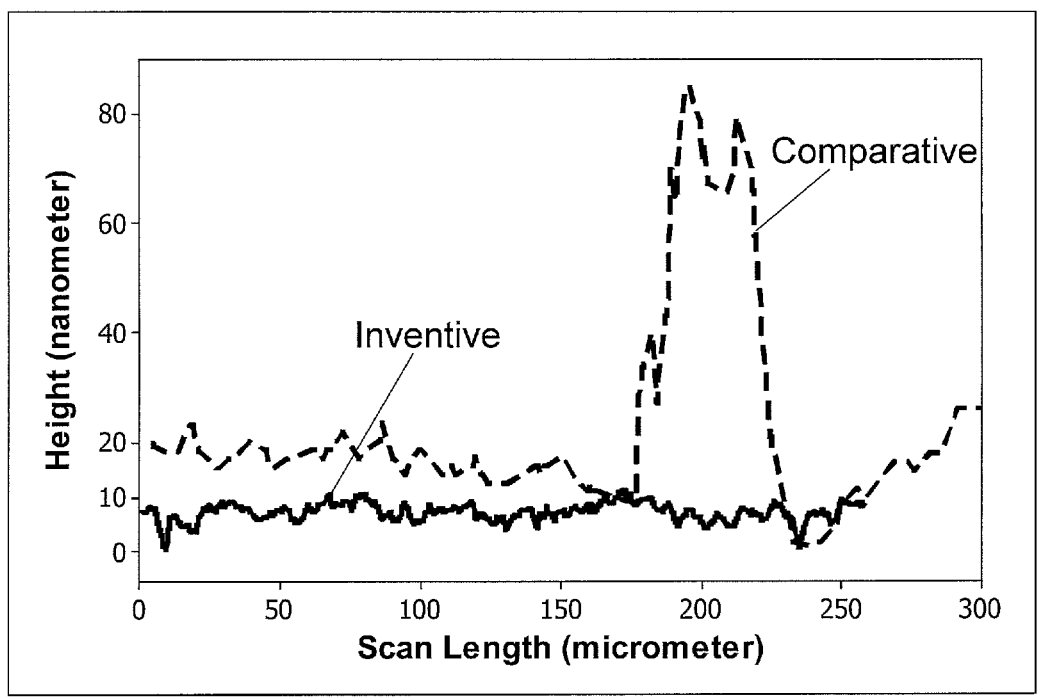
FIG. 1 is a surface profilometry of an inventive sample in accordance with the invention and a comparative sample.

Before the present methods and materials are described, it is to be understood that this disclosure is not limited to the particular methodologies and materials described, as these may vary. It is also to be understood that the terminology used in the description is for the purpose of describing the particular versions or embodiments only, and is not intended to limit the scope. For example, as used herein and in the appended claims, the singular forms "a", "an", and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

The invention is directed to a densified, inert, hard material that can be machined to a nanometer surface finish. In particular, the invention is a tungsten carbide material that has balanced, stoichiometric carbon and a low binder and is densified, inert, hard and yet machinable to nanometer surface finish.

The inventors have discovered a material composition that minimizes chemical reactivity to glass and enhances machinability to achieve nanometer-scale average surface roughness. The inventors have determined that such a material can be obtained by controlling the binder content and carbon stoichiometry for chemical reactivity and controlling the level of impurities, grain size and hardness for machinability. In particular, while the industry utilizes ditungsten carbide to obtain abrasion resistance and densification, the inventors have discovered that such properties can be achieved without the use of ditungsten materials. In fact, the inventors have discovered that by controlling the chemistry and the microstructure of a material, a material can be obtained that provides wear resistance properties without the use of a ditungsten carbide while being inert and stable. Such a material as described herein includes carbon at or near stoichiometry, a low binder, a low impurity content and a uniform and nominal grain size of less than about 0.5 microns. Additionally, the material is dense, exhibits uniform microhardness and has no observable porosity of about 0.5 microns or larger.

The material described herein is a tungsten carbide material that includes carbon, a binder, at least one grain growth inhibitor, with the balance being tungsten and impurities. An embodiment is directed to a material having 6.06-6.13 wt. % carbon, less than 0.25 wt. % binder, 0.20-0.55% by weight of at least one grain growth inhibitor, and the balance being tungsten and impurities.

The carbon content of the material is controlled to 6.06-6.13 wt. %. In embodiments, the carbon content of the material is 6.09-6.10 wt. %. The carbon level is preferably greater than 98.5% theoretical carbon. The inventors have discovered that controlling the lower limit of carbon content to 6.06 wt. % in the material suppresses the formation of unstable ditungsten carbide ($W_2C$) and η-phases and lower than full carbon saturation, and thereby results in a monotungsten carbide material. Additionally, the upper limit of the carbon content is controlled to allow for the desired single-phase material, monotungsten carbide, without the formation of carbon porosity. For example, a carbon content that exceeds 6.13 wt. % results in a porosity that is greater then 25 μm which is undesirable as it degrades surface finish.

As stated, ditungsten carbide is not desired in the material as it is more reactive than monotungsten carbide in acid and oxidizing atmospheres. Additionally, the coefficient of thermal expansion of monotungsten carbide is more isotropic than that of ditungsten carbide, making it a more desirable phase for dimensional consistency in applications such as glass molding operations. Further, the two phases (i.e. WC and $W_2C$) have different hardnesses and therefore present problems if coexistent in a surface requiring nanometer finishes. The tungsten carbide material herein is monotungsten carbide with less than 2% being of a phase with substoichiometric carbon.

The tungsten carbide composition further includes less than 0.25 wt. % total binder. The binder promotes or aids in the full densification of the tungsten carbide material and is relatively inert to the glass being molded. By producing a denser material, the porosity of the material is decreased, thereby allowing for better machinability which in turn allows for a nanometer level surface finish of the material. The upper limit is established to reduce the chemical potential so as to eliminate or substantially decrease, such as decrease by 90%, diffusion of the material into the glass. Examples of binder materials include cobalt, iron and nickel. In embodiments, the binder material may be relatively inert to the glass being molded.

In an embodiment, the binder is less than 0.15 wt. % cobalt, such as 0.05-0.15 wt. % and such as 0.05 wt. %-0.10 wt. %. In embodiments the binder may be 0.1-0.15 wt. %. Cobalt is less chemically reactive than iron and provides better wetting than iron and nickel in tungsten carbide systems. In other embodiments, the binder may include cobalt and iron or cobalt and nickel.

The tungsten carbide composition further includes 0.20-0.55 wt. % of at least one grain growth inhibitor, such as 0.30-0.45 wt. %. The grain growth inhibitor as understood by one skilled in the art is used to control grain growth during thermal processing and densification of powders. The grain growth inhibitor is preferably added in an amount sufficient to control the grain size of the material to a nominal grain size of less than about 0.5 microns. By controlling the grain size of the material the machinability of the material can be improved thereby aiding in a fine surface finish.

Examples of grain growth inhibitors include but are not limited to vanadium carbide, chromium carbide and niobium carbide. Vanadium carbide, chromium carbide and niobium carbide are effective at controlling grain growth and therefore the specified range is used in the material. In some embodiments, the grain growth inhibitor of the composition may be one of vanadium carbide, chromium carbide, or niobium carbide. In other embodiments, the grain growth inhibitor may be any combination of two or more of vanadium carbide, chromium carbide, and niobium carbide. In yet another embodiment, the grain growth inhibitor may be zirconium-niobium carbide. In an embodiment, the tungsten carbide material may have 0.28-0.32 wt. % vanadium carbide, such as 0.3 wt. %. In another embodiment, the material may have 0.2-0.5 wt. % of vanadium carbide and chromium carbide.

Certain grain growth inhibitors are not used in the inventive composition as they exhibit high reactivity, for example, with glass. Examples of such nondesired grain growth inhibitors include titanium carbide and/or tantalum carbide.

The total impurity level, including for example, iron of the composition of the invention is less than 0.60 wt. %, such as 0.10-0.60 wt. %. Impurities include but are not limited to titanium, tantalum, copper, molybdenum, and nickel. By controlling the amount of impurities, uniform phase compositions can be achieved and thermodynamic instabilities that can lead to the formation of porosity are reduced. As iron has higher chemical activity than cobalt, the amount of iron that may cause contamination of the glass is much smaller than an amount of cobalt to cause a comparable effect. Iron and other unintentional chemical components are also minimized to preclude the formation of additional phases in the finished microstructure. The inventors have discovered that controlling the amount of impurities as well as controlling the amount of binder as discussed above is a potential means to improving the mold performance.

In addition to controlling the impurities of the material to a low level, uniform microstructure across the surface and controlled grain size are desirable for machinability. The tungsten carbide material has a nominal grain size of 0.5 microns or less, such as less than 0.4 microns, such as 0.28-0.31 microns as measured by a linear intercept method on fracture surface at 20,000× magnification. Microstructural inconsistencies result in profilometry deviations on a polished surface. A very small grain size provides a more uniform polished surface and less chance of variances due to single grain pull out. Anomalous grain growth is controlled to a minimum by use of at least one of the grain growth inhibitors described herein.

The tungsten carbide material of the invention may have a Vickers hardness of at least about 2500 (1 kg. load). The hardness of the material is preferably high as it is an important factor in achieving nanometer surface finishes, for example, when used in glass molding operations. The material hardness is preferably uniform across the surface such that the rate of material removal is consistent during grinding, as localized areas of softer material, for example, due to composition, phase or defects, will relief polish. Conversely, localized areas of harder material may result in peaks in the surface profile when material removal is less than in surrounding areas. Thus, the hardness of a material is a function of composition, grain size, and processing.

The tungsten carbide material of the invention may be substantially free and/or preferably free of porosity and defects observable through optical microscopy. As used herein substantially free or free of porosity is defined as having no pores and/or no pores or anomalous microstructural features larger than 0.5 microns in size. In an embodiment, the tungsten carbide material has a void volume of less than 2%.

The tungsten carbide material described herein has a density of at least about 98% theoretical, preferably, at least about 98.5% theoretical, and, more preferably, at least about 99% theoretical. The theoretical density of monotungsten carbide is 15.63 g/cm$^3$. The theoretical density of the tungsten carbide material of the invention will vary from about 15.45 to about 15.61 g/cm$^3$, such as 15.53 g/cm$^3$.

In an embodiment, the material comprises 0.12 wt. % cobalt, less than 0.001 wt. % nickel, 0.048 wt. % iron, less than 0.001 wt. % titanium, 0.003 wt. % tantalum, 0.005 wt. % chromium, 0.29 wt. % vanadium, less than 0.001 wt. % copper, 0.02 wt. % niobium, 6.11 wt. % carbon, 0.12 wt. % nitrogen, 0.04 wt. % oxygen, and the balance being tungsten. In such embodiment, the binder is cobalt, the grain growth inhibitors are vanadium, chromium and niobium, and the impurities include iron, titanium, tantalum, and copper.

In another embodiment, the inventive material has 0.5 wt. % of a total combined amount of binder and grain growth inhibitor(s). The balance of the material is monotungsten carbide.

The tungsten carbide material discussed herein is inert as measured by inertness testing and observation of surface reactivity. Additionally, the inert tungsten carbide material when observed by optical metallography, has less than two occurrences of substoichiometric tungsten carbide, such as $WC_2$ per field of view at 1000× magnification. Additionally, as measured by x-ray diffraction, the material has no more than 2% of substoichiometric tungsten carbide. The machinability of the tungsten carbide material is measured through metallographic examination and surface profilometry after machining. The surface profilometry of the tungsten material described herein results in, for example, a maximum of two defects or abnormalities across a 10 mm diameter of a sample. Additionally, the profilometry profile of the tungsten carbide material has a $R_a$ and RMS of less than 2 nm±10% and an RMS of about 2.

The tungsten carbide material can be used in a number of applications. An example of an application is the use of the tungsten carbide material as tooling for molding precision glass lenses. Glass molding temperatures for example may vary with the type of glass being molded. The tungsten carbide material has the ability to withstand a working temperature of at least 650° C. and can provide oxidation resistance under molding conditions of vacuum or inert gas at such temperatures. In an embodiment, the tungsten carbide mold may further include a coating on an inner surface. Examples of such coating layers include but are not limited to diamond-like carbon, TiCN, NiAl and the like.

Another embodiment is directed to a method of manufacturing an article of the tungsten carbide material under controlled processing parameters. The method includes steps as understood by one skilled in the art such as compacting, debindering and densification. Additional steps may include, for example, machining, coating, grinding, and polishing.

In a step, a powder that includes 0.20-0.55 wt. % of at least one grain growth inhibitor, less than 0.25 wt. % binder, less than 0.6 wt. % impurities and balance being monotungsten carbide is prepared. The powder may have a nominal particle size of about 0.4 microns.

The powder is then consolidated or compacted into perform, near net shape, slug forms, or the like. Compaction may be performed by using direct, in-direct and/or super-high pressure pressing methods. Other examples of compaction may include uniaxial pressing, multi-platen pressing, dry bag pressing, cold isostatic pressing and/or super high pressure (SHP) compaction.

A step of removing a binder or debindering may include microwave sintering and spark plasma sintering to remove organic binders and densify the material. Binder removal usually entails heating the compacted product from ambient temperature to a temperature sufficient to pyrolyze the highest molecular weight component. If a polyolefin for example is used as part of the binder formulation, the temperature sufficient to pyrolyze the highest molecular weight component commonly occurs from 500° C. to about 600° C. An especially suitable temperature for the burn-out step may be about 750° C. to about 900° C. which is the temperature at which the reduction of carbon by the oxide can take place and carbon monoxide and/or carbon dioxide may be evolved. Binder burn-out processes may be performed in vacuum or in any inert atmosphere. A reducing atmosphere, i.e., CO or $H_2$, can also be used, but the carbon-getters would have to be adjusted accordingly to yield the desired results. Alternatively or subsequent to binder burn-out, the compacted product may be debindered using chemical methods.

After debindering operations, the debindered compacted product undergoes a thermal densification step. The step may include pre-sintering, green machining, reisopressing, and the like. For example, the compacted product may be sintered at elevated temperatures by pressure-assisted or pressureless techniques. Typical sintering temperatures for tungsten carbide are from about 1400° C. to about 1850° C., more typically, from about 1600° C. to about 1700° C. A temperature hold between 800° C. and 1200° C. is preferred either in the debindering step or in the sintering step to allow the release of carbon monoxide and/or carbon dioxide before it is trapped in the material by densification. The greatest benefit of the present invention is realized in pressureless sintering techniques, which are sintering techniques performed at or below atmospheric pressure. The sintering atmosphere may be, for example, inert gas, such as argon.

Depending on additives and the sintering temperatures employed, the sintering may be liquid-phase sintering or non-liquid-phase sintering. Liquid-phase sintering is sintering which occurs at a temperature at or above the liquidus temperature of the material being densified or any added materials, such as "sintering aids" (which are added to enhance sinterability). Non-liquid-phase sintering is sintering which occurs at a temperature below the liquidus temperature of all of the components of the material being densified. Usually, with tungsten carbide and pressureless sintering techniques, non-liquid phase sintering is employed.

Other examples of achieving densification include thermal processes such as vacuum sintering, process gas sintering, pressure sintering, Rapid Omni-directional Compaction, microwave sintering, and/or spark plasma sintering. In embodiments where the tungsten carbide material utilizes vanadium carbide as the grain growth inhibitor, uniform densification may occur with the use of high pressing pressures or significantly altered thermal densification cycles.

The method may further include steps of hot isostatic pressing (HIP). In alternate embodiments grinding may be performed on blanks prior to semi-finish and finishing operation. After such operations profilometry may be used to assess the surface roughness after grinding and polishing of the compacted product.

The compacted product may be a mold, blank, semi-finished or finished article. An another embodiment includes a method of forming a blank, semi-finished or finished tungsten carbide mold. Other embodiments include single cavity or multicavity arrays.

The following examples are intended to illustrate the invention and should not be construed as limiting the invention in any way.

EXAMPLES

TABLE 1

|  | Comparative<br>WC-0.30%Co-0.3%VC | Inventive<br>WC-0.12%Co-0.3%VC |
|---|---|---|
| Carbon | 6.02% | 6.11% |
| Impurities | <0.7%<br>(0.20% Fe) | <0.6%<br>(<0.10% Fe) |

Table 1 sets forth the compositions (in wt. %) of a comparative tungsten carbide sample and an inventive tungsten carbide sample. Both samples were prepared by debindering and Rapid Omni-directional Compaction followed by rough grinding operations to finish blanks to size. The grinding processing parameters for the samples included the following: wheel size of 1400, wheel diameter of 18.0, speed of 30,000 rpm and workpiece speed of M04 S180 with a feed rate of F 0.5 for 1.5 hrs. The microstructural uniformity, as measured by metallographic examination and surface profilometry after machining was obtained for each sample.

Figure 2:
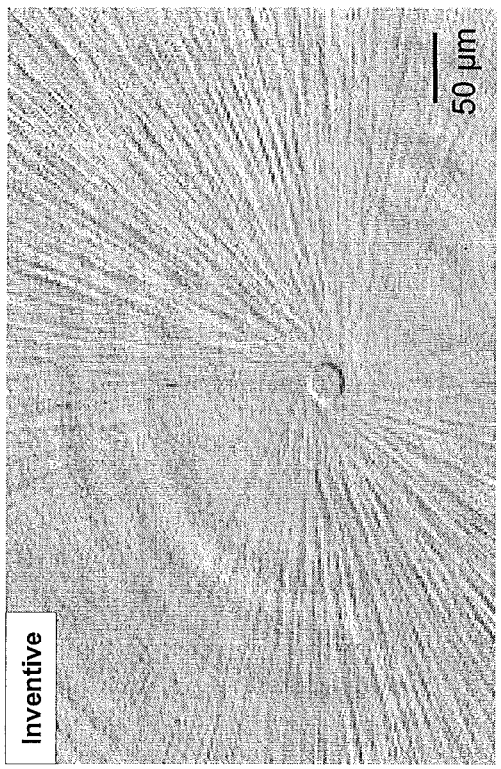
FIG. 2 illustrates a photomicrograph of the inventive sample and a photomicrograph of the comparative sample.
Figure 2:
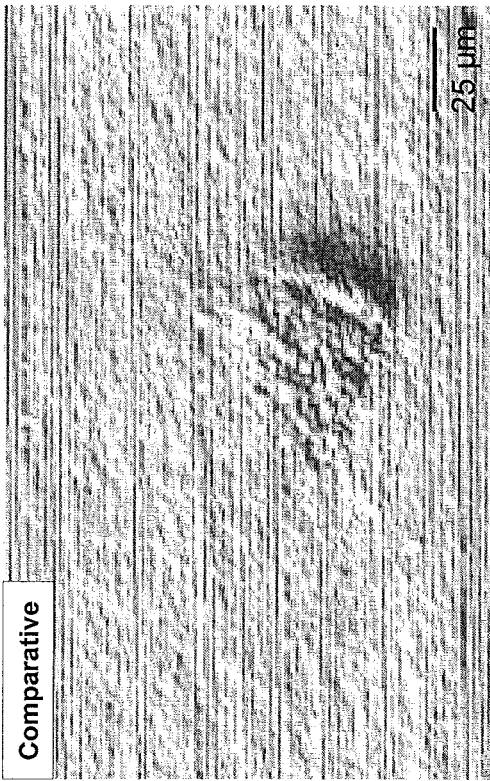

FIG. 1 is a graph of the profilometry of the machined inventive sample and the machined comparative sample. The profilometry included a 300 micron length scan across the surface of each sample. As can be seen in FIG. 1, the profilometry of the comparative sample includes a large peak in the graph indicating the presence of a defect on the sample surface. In contrast, the profilometry of the inventive sample includes no large peaks and was a scan with minimal deviation across the sample surface. FIG. 2 is a photomicrograph of the surface of the comparative sample and the inventive sample, respectively. The surface abnormality of the comparative sample in FIG. 2 corresponds to the deviation or large peak in the profilometry scan of the comparative sample in FIG. 1. Conversely, the photo micrograph of the inventive sample displayed no large structures and rather showed homogeneous surface structure.

Figure 3:
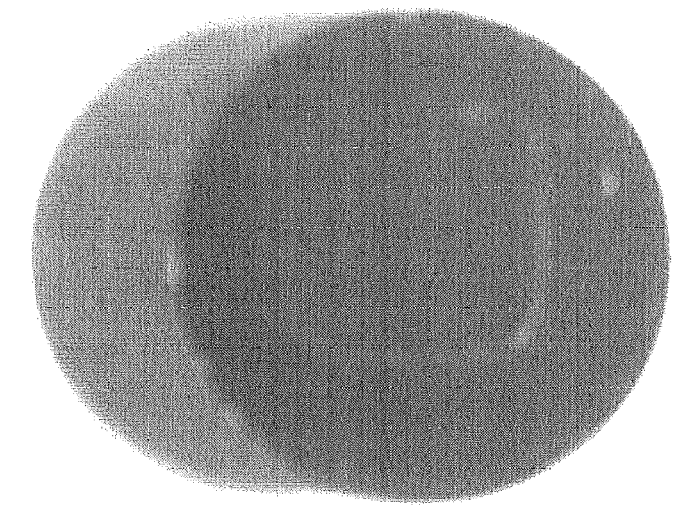
FIG. 3 is a top surface view of the inventive sample and the comparative sample after inertness testing.
Figure 3:
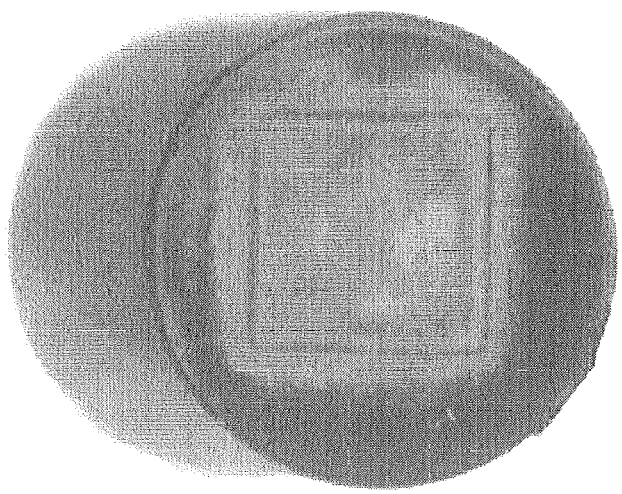

The inventive and comparative samples underwent further testing to observe the stability of the material composition. The test performed was an inertness test as used in the industry. The test included placing each sample with a glass material adjacent to a surface thereto, in a quartz tube with flowing nitrogen gas. The glass composition was 63% oxygen, 7% fluorine, 22% silicon and 8% potassium. Each sample was held in the furnace for 5 minutes at about 650° C., cooled and observed for reactions between the glass and the mold Images of the tested comparative sample surface and the inventive sample surface are provided in FIG. 3. Based on a visual inspection of the samples, the comparative sample clearly illustrated a surface reaction on its surface, including a distinct outline of the piece of glass thereon during testing. The surface reaction evidenced a high degree of reactivity of the comparative sample with the glass material. Conversely, the inventive sample displayed minimal visible markings on its surface, thereby demonstrating the inertness or stability of the inventive material with the glass material.

Figure 4:
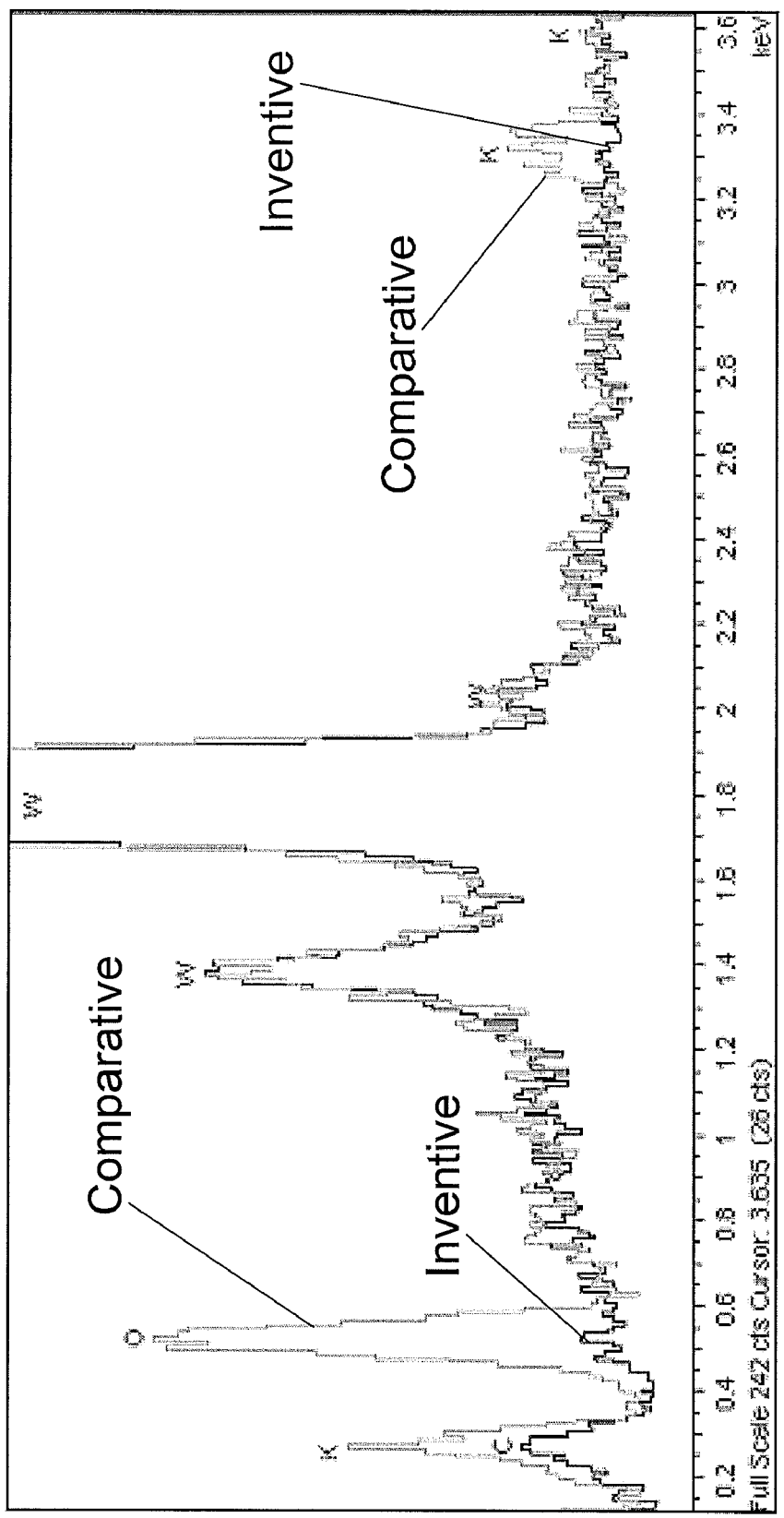
FIG. 4 is an EDS scan of the inventive sample and the comparative sample.

The reacted surface areas of the inventive sample and the comparative sample were evaluated by energy dispersive x-ray spectroscopy (EDS). The EDS spectrum of the inventive sample and the comparative sample is provided in FIG. 4. As can be seen, the EDS scan for the comparative sample showed higher levels of oxygen and potassium content in the reacted area than the inventive sample surface. The higher levels of oxygen and potassium further evidence the reactivity between the sample and the glass material, specifically, the diffusion of oxygen and potassium from the glass material to the sample material. This high level reactivity as seen on the surface of the comparative sample in turn increases surface defects and minimizes, for example, the mold life. Conversely, the EDS scan of the inventive sample illustrated a minimal amount of elemental diffusion from the glass to the mold.

While it is anticipated herein that the tungsten carbide material can be utilized in tooling for molding precision glass lenses for imaging applications it is not limited to such applications. Additional use of the material includes but is not limited to molding of laser collimator lens, molding of other articles that require fully dense, high hardness tungsten carbide, and mirrors.

Whereas, particular embodiments of this invention have been described above for purposes of illustration, it will be evident to those skilled in the art that numerous variations of the details of the present invention may be made without departing from the invention as defined in the appended claims.

What is claimed is:

1. A tungsten carbide material comprising:
   6.06-6.13 wt. % carbon;
   0.20-0.55 wt. % grain growth inhibitor;
   less than 0.25 wt. % binder;
   less than 0.6% wt. % impurities; and
   balance being tungsten,
   wherein the tungsten carbide material has a nominal grain size of less than 0.5 microns.

2. The tungsten carbide material of claim 1, wherein the binder comprises from 0.1 to 0.15 wt. % cobalt.

3. The tungsten carbide material of claim 1, wherein the tungsten carbide material comprises from 6.09 to 6.10 wt. % carbon.

4. The tungsten carbide material of claim 1, wherein the tungsten carbide material consists essentially of monotungsten carbide.

5. The tungsten carbide material of claim 1, wherein the tungsten carbide material has a nominal grain size of from 0.25 to 0.4 microns.

6. The tungsten carbide material of claim 1, wherein the grain growth inhibitor is vanadium carbide, chromium carbide, niobium carbide, or a combination thereof.

7. The tungsten carbide material of claim 1, wherein the tungsten carbide material is a mold used in precision glass molding.

8. The tungsten carbide material of claim 1, wherein the tungsten carbide material has a density of at least 98% of theoretical density and a void volume of less than 2%.

9. A mold made for precision glass molding comprising:
   6.06-6.13 wt. % carbon;
   0.20-0.55 wt. % grain growth inhibitor;
   less than 0.25 wt. % total binder;
   less than 0.6 wt. % impurities; and
   a balance being tungsten,
   wherein the mold has a nominal grain size of less than 0.5 microns.

10. The mold of claim 9, wherein the grain growth inhibitor is vanadium carbide, chromium carbide, niobium carbide, or a combination thereof.

11. The mold of claim 9, wherein the mold has a nominal grain size from 0.25 to 0.4 microns.

12. The mold of claim 9, wherein the binder comprises from 0.1 to 0.15 wt. % cobalt.

13. The mold of claim 9, wherein the mold comprises from 6.09 to 6.10 wt. % carbon.

14. The mold of claim 9, wherein the mold has a density of at least 98% of theoretical density and a void volume of less than 2%.

15. A method of manufacturing an article for molding glass comprising:
   compacting a material;
   debindering the material; and
   thermally densifying the material,
   wherein the material comprises, 0.20-0.55 wt. % grain growth inhibitor, 6.06-6.13 wt. % carbon, less than 0.25 wt. % binder, less than 0.6 wt. % impurities and balance being tungsten.

16. The method of claim 15, further comprising machining the material after thermally densifying the material.

17. The method of claim 15, wherein the material comprises from 6.09 to 6.10 wt. % carbon.

18. The method of claim 15, wherein the binder comprises from 0.1 to 0.15 wt. % cobalt.

19. The method of claim 15, wherein the step of thermally densifying comprises thermal sintering, pressure assisted sinter (HIP), rapid omnidirectional compaction, microwave sintering and spark plasma sintering.

20. The method of claim 18, wherein the article is selected from the group consisting of a mold, a blank, or a semi-finished component.

* * * * *

UNITED STATES PATENT AND TRADEMARK OFFICE
CERTIFICATE OF CORRECTION

PATENT NO. : 8,173,561 B2
APPLICATION NO. : 12/615885
DATED : May 8, 2012
INVENTOR(S) : Elizabeth Ann Binky Peterson et al.

It is certified that error appears in the above-identified patent and that said Letters Patent is hereby corrected as shown below:

IN THE SPECIFICATION

In Column 6, Line 50, delete "WC2" and insert -- W2C --, therefor.

In Column 9, Line 5, delete "mold" and insert -- mold. --, therefor.

Signed and Sealed this
Thirtieth Day of April, 2013

Teresa Stanek Rea
*Acting Director of the United States Patent and Trademark Office*